Figure 3:
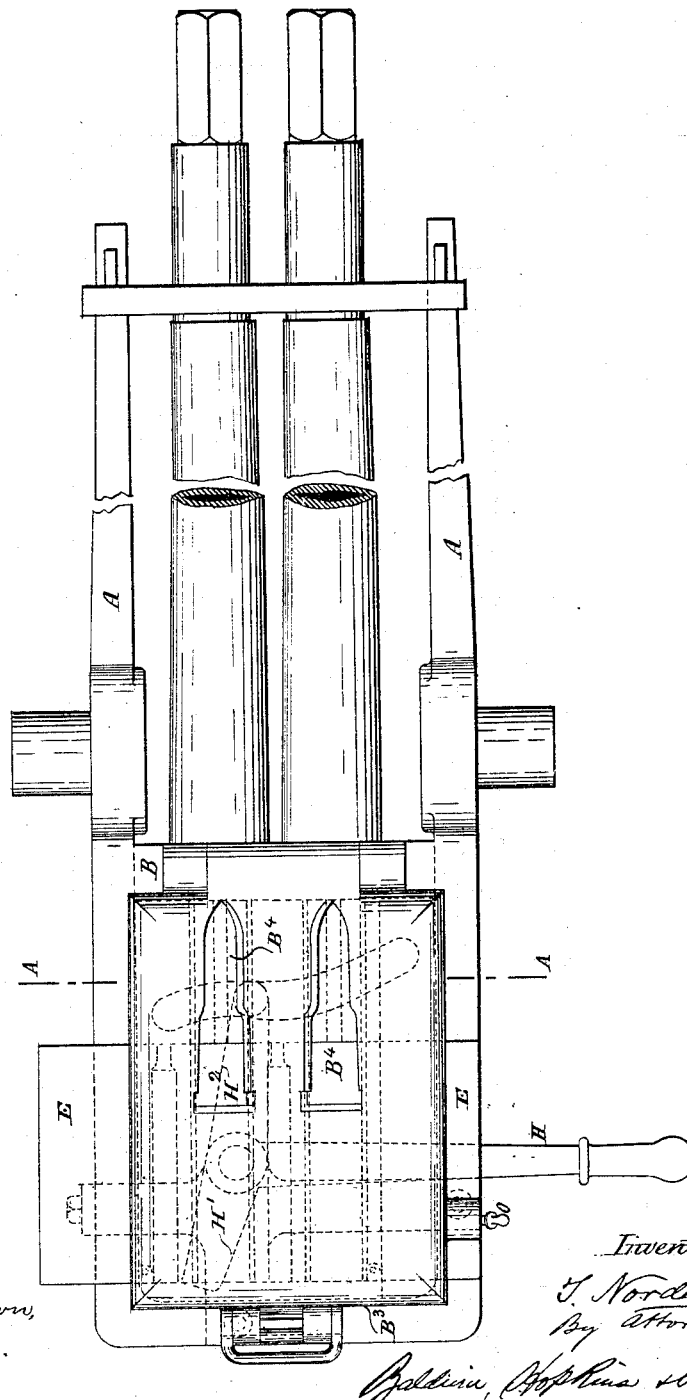

(No Model.)　　　　　　　T. NORDENFELT.　　　　6 Sheets—Sheet 1.
MACHINE GUN.
No. 303,879.　　　　　　　　　Patented Aug. 19, 1884.
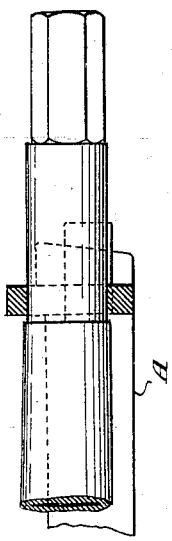
Fig. 1.
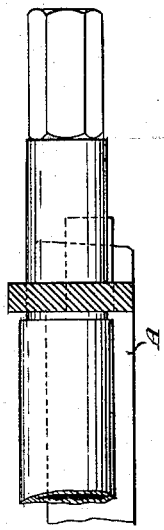
Fig. 2.
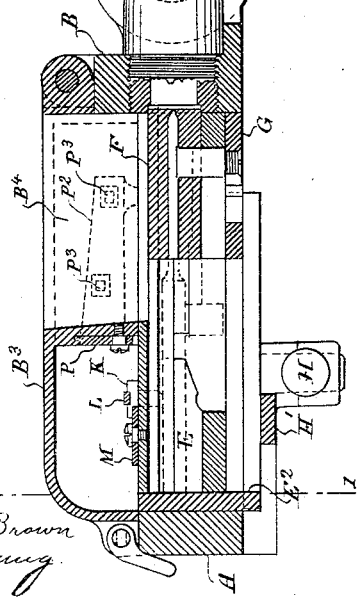
Witnesses.
Eugene V. Brown
James Young
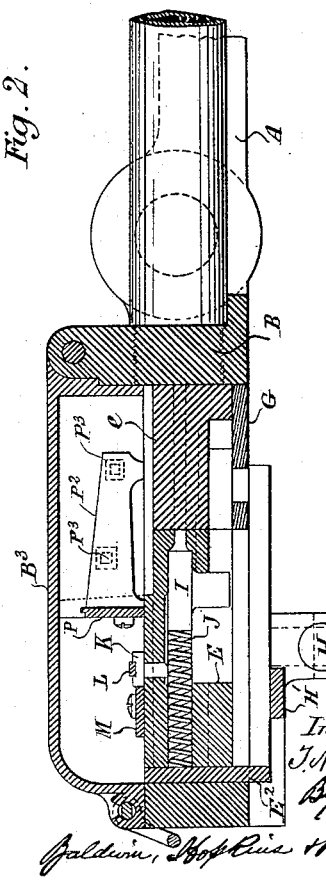
Inventor
T. Nordenfelt,
By attorneys
Baldwin, Hopkins & Peyton.
N. PETERS. Photo-Lithographer. Washington, D. C.

(No Model.)  T. NORDENFELT.  6 Sheets—Sheet 2.

MACHINE GUN.

No. 303,879.  Patented Aug. 19, 1884.

Witnesses.
Eugene V. Brown,
James Young.

Inventor
T. Nordenfelt,
By Attorneys
Baldwin, Hopkins & Peyton.

(No Model.)  T. NORDENFELT.  6 Sheets—Sheet 3.

MACHINE GUN.

No. 303,879.  Patented Aug. 19, 1884.

Witnesses.
Eugene V. Brown,
James Young.

Inventor
T. Nordenfelt.
By attorneys
Baldwin Hopkins & Peyton.

(No Model.)  6 Sheets—Sheet 4.
T. NORDENFELT.
MACHINE GUN.
No. 303,879. Patented Aug. 19, 1884.
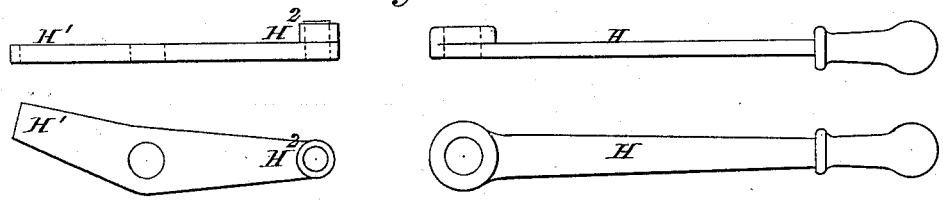
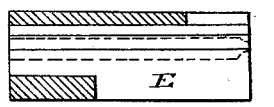
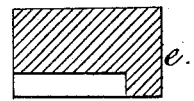
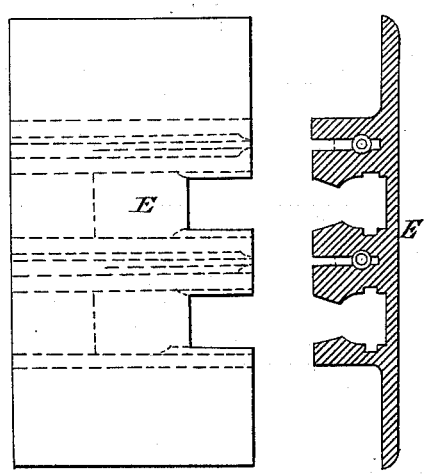
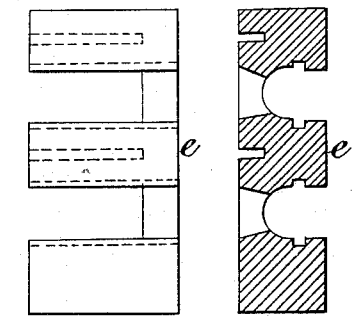
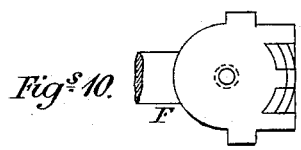
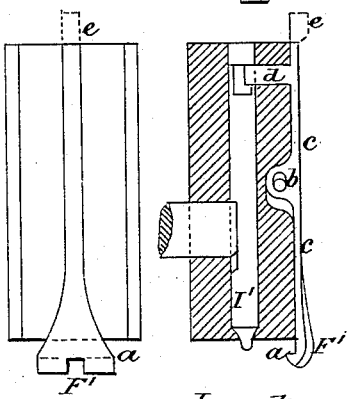
Witnesses.
Eugene V. Brown,
James Young.
Inventor
T. Nordenfelt.
By Attorneys
Baldwin, Hopkins & Peyton.

(No Model.) 6 Sheets—Sheet 5.
T. NORDENFELT.
MACHINE GUN.
No. 303,879. Patented Aug. 19, 1884.
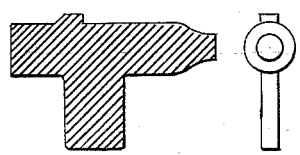
Fig.ˢ 11.
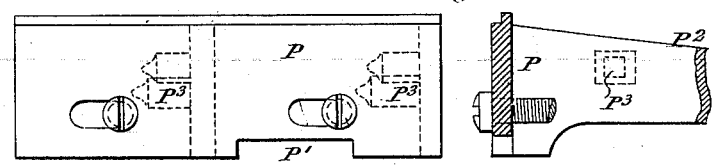
Fig.ˢ 12.
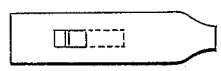
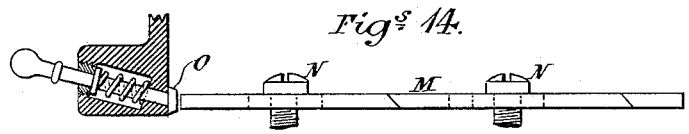
Fig.ˢ 14.
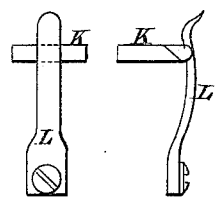
Fig.ˢ 13.
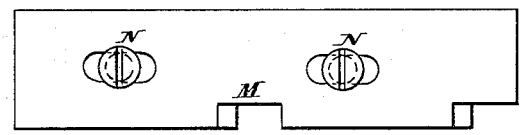
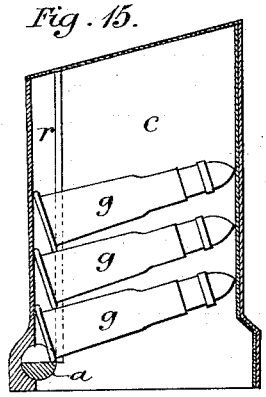
Fig. 15.
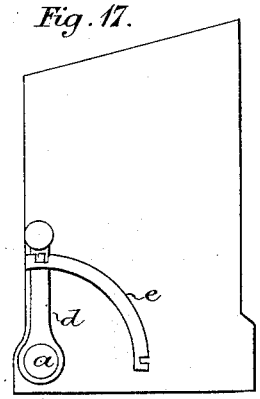
Fig. 17.
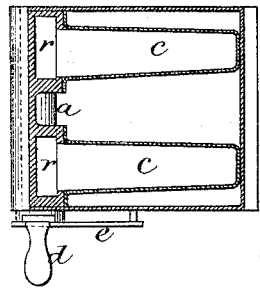
Fig. 16.
Witnesses.
Eugene V. Brown,
James Young.
Inventor.
T. Nordenfelt,
By Attorneys,
Baldwin, Hopkins & Peyton.
N. PETERS. Photo-Lithographer. Washington, D. C.

(No Model.)   T. NORDENFELT.   6 Sheets—Sheet 6.

MACHINE GUN.

No. 303,879.                Patented Aug. 19, 1884.

Witnesses            Inventor.

United States Patent Office.

THORSTEN NORDENFELT, OF WESTMINSTER, ENGLAND.

MACHINE-GUN.

SPECIFICATION forming part of Letters Patent No. 303,879, dated August 19, 1884.

Application filed May 23, 1883. (No model.) Patented in England April 5, 1881, No. 1,488; in France May 30, 1881, No. 143,122; in Germany June 9, 1881, No. 18,836; in Belgium October 19, 1881, No. 56,017; in Italy November 10, 1881, No. 13,531; in Spain December 17, 1881, No. 2,095; in Austria January 10, 1882, No. 36,603; in Sweden December 1, 1882, and in Norway March 6, 1883.

*To all whom it may concern:*

Be it known that I, THORSTEN NORDENFELT, a subject of the King of Sweden, residing at 53 Parliament Street, in the city of Westminster, England, have invented certain new and useful Improvements in Machine-Guns, (for which I have received Letters Patent in Great Britain, No. 1,488, dated April 5, 1881; in France, No. 143,122, dated May 30, 1881; in Germany, No. 18,836, dated June 9, 1881; in Belgium, No. 56,017, dated October 19, 1881; in Italy, No. 13,531, dated November 10, 1881; in Austria, No. 36,603, dated January 10, 1882; in Spain, No. 2,095, dated December 17, 1881; in Sweden, dated December 1, 1882, and in Norway, dated March 6, 1883,) of which the following is a specification.

This invention has for its object improvements in machine-guns. The barrels, which may be two or more in number, are arranged side by side in a frame, and behind them there is a breech-block. This breech-block is in two parts. The fore part is stationary, and has trough-like cavities in it opposite to the breeches of the barrels. The hinder part of the breech-block has similar cavities, and it receives a transverse movement to and fro. There are plungers lodged in the cavities, and these have longitudinal movement imparted to them. The cartridges are supplied to the gun automatically. They descend from a magazine or hopper into the recesses of the stationary fore part of the breech-block, (which I call the "carrier,") and by the advance of the plungers they are thrust into the barrels. The hinder part of the breech-block (which I call the "action-block") then moves to one side to support the plungers in rear and to bring opposite to them hammers, which the action-block contains. The cartridges are fired by firing pins or strikers contained within the plungers, and which receive the blows of the hammers. Afterward the plungers recede into the recesses of the action-block, which come into position to receive them, and extractors with which the plungers are provided withdraw the cartridge-cases from the barrels. The cartridge-cases fall out through holes provided for the purpose in the bottoms of the trough-like recesses, and their places are taken by other cartridges from the magazine. The mechanism is actuated by the to-and-fro movement of a hand-lever. The motion of the plungers is obtained by a friction-roller attached to a lever working in a slot in a plate carrying the plungers, and the motion of the action-block is obtained by the tail end of the lever engaging a slot in the spring-bar. The descent of the cartridges from the magazine is controlled by a feed-plate, and motion is given to this plate by a projection on the action-block working in a slot in the feed-plate. Instead of allowing the cartridges in the magazine to lay on the top of one another freely, or to be guided only by their rims running within a slot for each column, as in magazines hitherto used, I gain a more regular feed by supporting the bullet-points (while still retaining the slots for the rims) in such a manner that the cartridges during their run through the whole of the magazine or hopper, except in the very lowest part of the hopper, are always guided downward in a position with the bullet, held at a higher level than the rim. I support the points of the bullets by bringing the front plates of the mazazine nearer to the rear plate than the actual length of the cartridge. The cartridge then, by its own weight, has the rear side of the base pushed against the rear plate, and it runs along this rear plate without fear of the sharp corners of the rim causing the cartridge to hang, or to indent the guiding-edges of the slot. At the lowest portion of the hopper I allow the front plate to recede forward, so as not to support the bullet-point any longer, and this at a point sufficiently high above the base of the hopper to allow the bullet, which is heavier than the base of the cartridge-case, to fall down in time for the cartridge to enter the mechanism in a position parallel with the surface of the cartridge-receiver. The cartridges within the hopper are thus supported all in regular positions, and a cartridge does not touch the cartridge next below it except at one place near the rim, so that two cartridges cannot jam one another, and any unevenness on the cartridge cannot cause one cartridge to stick to another one. At or near the base of the hopper I insert a bar from side to side through the rim-slots, with a small handle or crank at the end of it. This bar is mutilated or faced off on one side just enough to allow the rims to pass; but when I turn the bar, by means of the handle, round a portion of the circle, this movement brings the thicker part of the bar, which has not been faced off, into the rim-slots, and thus prevents cartridges passing. By thus turning the handle to the one side I can retain all cartridges that may be within the hopper, so that I can lift off the hopper without the remaining cartridges falling out of it, and by turning the handle back again, after putting the hopper onto the gun, I again give a supply of cartridges to the mechanism of the gun. The handle can be held in the position desired by means of a pin or a catch. With a view to make the mode of extraction more simple and effective than before, I make my extractor and its spring in one piece let into the breech-plug along its surface, the forward end having either a single or a two-pronged extractor-hook, depending upon the strength of the extractor required and the arc of the rim over which I want to pull. The other end of the extractor rests upon the solid part of the breech-plug. The part of the extractor between the hook in front and the rear end is tempered, and acts as a spring either direct or pivoting upon the pin, which I insert to hold the extractor in position. Near the rear end of the extractor is a lug, which enters into the breech-plug so deeply that it either presses upon the firing-needle or reaches into an indent in the needle, so as to prevent the needle from falling out rearward, and so as to hold it steadily in position and prevent unnecessary wear and tear when used for drill purposes. Although the needle is held by the lug on the extractor, the needle can be taken out without unscrewing the extractor-pin simply by pushing the pin rearward hard enough to raise the lug out of the indent in the needle.

In order that my said invention may be most fully understood and readily carried into effect, I will proceed to describe the drawings hereunto annexed.

Figure 5:
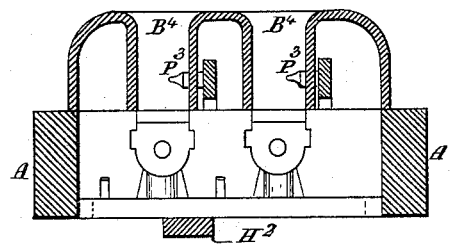
Figure 4:
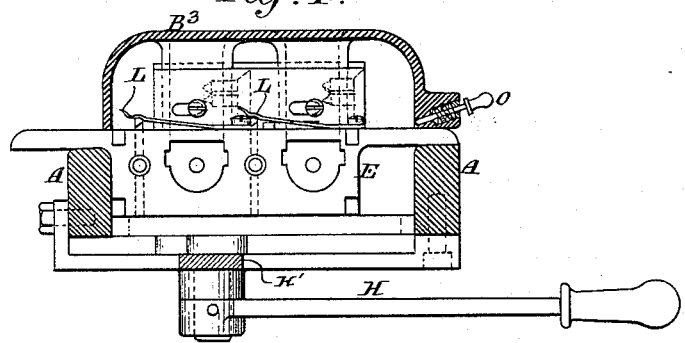
Figure 18:
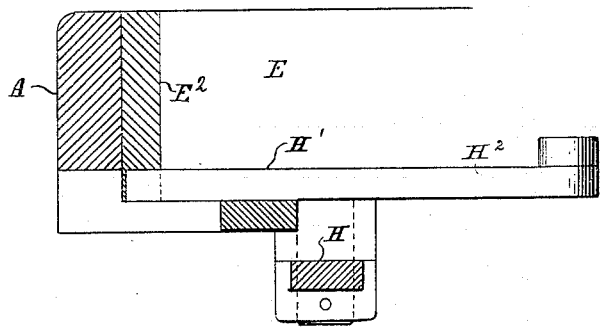
Figure 19:
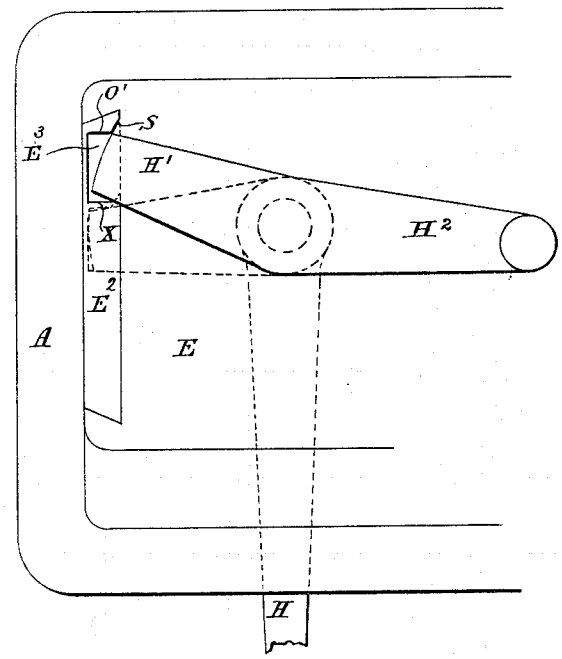

In the drawings, Figures 1 and 2 are longitudinal sections of a machine-gun constructed in accordance with my invention. Fig. 3 is a plan. Fig. 4 is a back view with some of the parts in section, and Fig. 5 is a cross-section on the line A A in Fig. 3. Figs. 6 show the lever-handle. Figs. 7 show the action-block. Figs. 8 show the carrier. Figs. 9 show the plate carrying the plungers. Figs. 10 show the plunger and extractor. Figs. 11 show the hammers. Figs. 12 show the cartridge-feeder. Figs. 13 show the spring-catch for retaining the hammer, Fig. 14, the trigger-comb. Fig. 15 is a vertical section of the magazine or cartridge hopper. Fig. 16 is a horizontal and Fig. 17 is a vertical section of the same. Fig. 18 is a view partly in side elevation and partly in vertical section, and Fig. 19 a plan view, showing details of the action-block and its connections.

In the gun shown by these figures the rear ends of the barrels are screwed into a cross-piece, B, forming part of a frame, A.

The fore end of the divided breech-block is marked $e$. This I call the "carrier." It is fixed to the frame immediately behind the center cross-piece, B, the rear end, E, (which I call the "action-block,") with the spring-bar $E^2$ attached to its rear end for forming an abutment for the springs of the hammers, fills this space (endwise) between the carrier $e$ and the frame. The part E has a transverse intermittent motion communicated to it by an arm, H', extending backward from the hand-lever H. Separate views of this lever and the arms which are connected with it are shown at Fig. 6. The lever H pivots upon a bracket on the trunnion-frame. An arm, $H^2$, of this lever has a friction-roller attached, which works in a cam-shaped slot in the plate G, and imparts to it a longitudinal movement to and fro. The arm H' enters a notch or slot, $E^3$, in the spring-bar $E^2$, which is fixed to the rear end of the action-block E, and carries the action-block to the right or left, as required. The arm H' moves at the same time as the hand-lever H. When the hand-lever is moved forward, the arm H' acts against the surface X in the slot $E^3$ and carries the action-block over to the right. Moving the hand-lever rearward, the arm H' acts against the surface O' in the slot $E^3$ and carries the action-block over to the left. When it is brought fully over to the left, the arm H' leaves the slot $E^3$, the back plate being cut away for this purpose at S.

Separate views of the action-block are shown at Figs. 7, and of the carrier or fore end $e$ of the breech-block at Figs. 8, also separate views of the moving plate G at Figs. 9.

The plungers F, which slide in the recesses in the two parts of the breech-block, are carried on studs on the plate G, and they carry strikers I' and extractors F', as shown at Figs. 10.

The hammers I (separate views of which are shown at Figs. 11) and spiral springs J run in channels in the action-block E, and are not in line with the strikers I' until the proper moment for firing.

The cartridge-feeder P (separate views of which are shown at Fig. 12) is actuated by a projection upon the action-block E. The projection enters but does not fit within a slot, P', in the bottom of the feeder, so that the feeder moves with the action-block during a portion of its traverse. The cartridge-feeder is a traverse-slide, with longitudinal arms $P^2$, carrying pegs $P^3$, which project into the passages $B^4$ in the cover $B^3$, down which the cartridges descend from the magazine. The pegs $P^3$ project through holes in the sides of these passages and support the cartridges. The cartridges beneath the pegs rest on the plungers F, which support them until the plungers recede and permit the cartridges to fall down into position to enter the barrels, when the plungers return.

The action is cocked by studs or projections $G^3$ upon the moving plate G, which, carrying the hammers I backward, compress the spiral springs J. The hammers are held back during the forward movement of the plunger-plate by the catches K, pressed downward by springs L. (Shown separately by Figs. 13.) The hammer-catches are raised at the proper moment by inclines on a trigger-comb, M, shown separately by Figs. 14. The hammers are released by the lateral motion of the comb on the action-block, which carries it, caused by its being brought into contact with the stop O, when this is placed for automatic action, and in the same way the gun can be fired by hand at any time when the stop O is pressed inward.

The extractor, as shown in Fig. 10, consists of one piece, comprising the hook $a$, the boss $b$, the spring $c$, the needle-stop $d$, and in some cases (in guns in which the plunger is screwed into a carrier) of a tail, $e$, as dotted, to serve as a key. It is let into the slot in the plunger and fastened by a pin through a hole in the boss $b$. To avoid taking up too much power in loosening all the cartridge-cases at once, the hole in the boss $b$ is in one or more of the extractors round, but in the others oval and of different lengths, allowing the plungers to be moved a little backward before the extractors with oval holes commence their pull on the cartridge-cases. The spring $c$ is the shank of the extractor, and ends at the rear with a lug, $d$, which goes through an opening in the plunger into the firing-pin to prevent this from being blown out backward. The hook $a$ of the extractor is widened out to nearly a quarter of a circle, so as to get a good grip of the cartridge-rim; but it is slotted through in the middle for giving the rim more surface to resist the cutting force. If this extractor is used on plungers which are screwed into the breech-block, the rear end should be lengthened to a tail, $e$, as shown in dotted lines. This tail, when the extractor, which is fixed after the plunger is screwed home, is pushed into corresponding slots in the breech-block, acts as a key and prevents the plunger from unscrewing itself.

The magazine or cartridge hopper is shown in Figs. 15, 16, and 17. Fig. 15 is a vertical section, Fig. 16 a horizontal section, and Fig. 17 an outside view. It consists of as many cartridge-holders $c$ as there are barrels in the gun, and each cartridge-holder is widened out at the rear end, with recesses $r$ on both sides to receive and guide the cartridge-rims. The upper part of the hopper is shorter than the length of the cartridges $g$, but at the front side the lower end is lengthened to allow the cartridge to fall down to a horizontal position on the feed-plate when the point of the projectile has passed the cover $f$. At the rear lower end, in the wall of the hopper, there is a through-shaft, $a$, which, on the part where it is in the cartridge-holders, is mutilated by being slotted out to the same depth and width as the passage for the cartridge-rim. At one end of this shaft on the outside of the hopper, is fixed a lever, $d$, which can be turned a quarter of a circle, and it has a stud catching in notches in the bow $e$, or by other arrangements is stopped in the required position. The cartridges $g$ are put into the hopper, so that when this is placed on the gun they slide down with the points of the projectile raised and supported by the front wall of the hopper and the base or rim of the cartridge inclined. In this position the cartridges descend freely without the sticking or hanging up, which often occurs when the cartridges are laid horizontally one over the other. When the shaft $a$ is placed with the slots horizontally, the rim of the lowest cartridge is stopped against it and the cartridges are retained in the hopper; but by turning the lever $d$ downward the sides of the slots become flush with the sides in the cartridge-holders. The passages for the cartridges are thus free and the cartridges fall in their turn onto the feed-plate. If the hopper is to be taken off before all the cartridges are fired, it is only required to turn the lever $d$ up again, and the unfired cartridges which have not fallen onto the feed-plate are retained in the hopper.

The action of the gun is as follows: The backward stroke of the lever H first carries the breech-block E to the left, at the same time cutting off a layer of cartridges. It then withdraws the plungers F and empty cases, and it compresses the springs J and cocks the gun. During this time the empty cases have fallen through the openings in the carrier, and the layer of cartridges which were lying upon the plungers F have fallen into the recesses. The lever, now being reversed, pushes the cartridges into the chamber. Next it carries the action-block E over to the right, at the same time moving the cartridge-plate P and allowing another layer of cartridges to fall and rest upon the plungers. Afterward it releases the hammers I and fires the cartridges.

Having thus described the nature of my said invention and the manner of performing the same, I would have it understood that I claim—

1. The combination of the barrels, the divided breech-block consisting of a stationary trough-like part in rear of the barrels, and the transversely-moving part behind said stationary part, and the plungers passing from one part to the other of the breech-block, substantially as and for the purpose hereinbefore set forth.

2. The combination of the plungers, the slotted actuated plate having pins on its upper surface, on which the plungers are carried, and the lever-arm having a projection entering the slot of said plate, substantially as and for the purpose hereinbefore set forth.

3. The combination of the action-block carrying strikers, and having recesses into which plungers retire, and a notch at its rear, the lever, and the lever-arm, the rear end of which engages the notch in the action-block, substantially as and for the purpose hereinbefore set forth.

4. The combination of the plungers, the firing-pins within them, the transversely-moving action-block having recesses in it, into which the plungers retire, and the hammers within the block, substantially as and for the purpose hereinbefore set forth.

5. The combination of the transversely-moving cartridge-feeder slide, to which the cartridges are supplied, the arms secured thereto, the pegs carried by said arms, and the cartridge-passages into which said pegs project, substantially as and for the purpose hereinbefore set forth.

6. The combination of the plungers, the firing-pin, and the one-piece extractor and spring serving as a stop to prevent the escape of the firing-pin from its place in the plunger, substantially as set forth.

7. The magazine or cartridge-hopper, constructed as described, with a support against which the bullet ends of the cartridges bear, said support terminating near the lower part of the magazine, and serving to keep the cartridges inclined until they near the bottom of the magazine, for the purpose described.

8. The combination of the magazine or cartridge-hopper, the guide-track by which the flanges at the bases of the cartridges pass down said magazine, and the mutilated semi-rotary shaft crossing the rear end of the magazine, traversing the guide-track, and supporting the bases of the cartridges within the guide-track, substantially as and for the purpose herein set forth.

THORSTEN NORDENFELT.

Witnesses:
  G. W. WESTLEY,
  GEO. J. B. FRANKLIN,
  *Both of 17 Gracechurch Street, London.*